June 10, 1941.                J. T. DICKSON                2,244,942
                       CONTROL VALVE FOR FLUID BRAKES
                          Filed Feb. 26, 1940            2 Sheets-Sheet 2
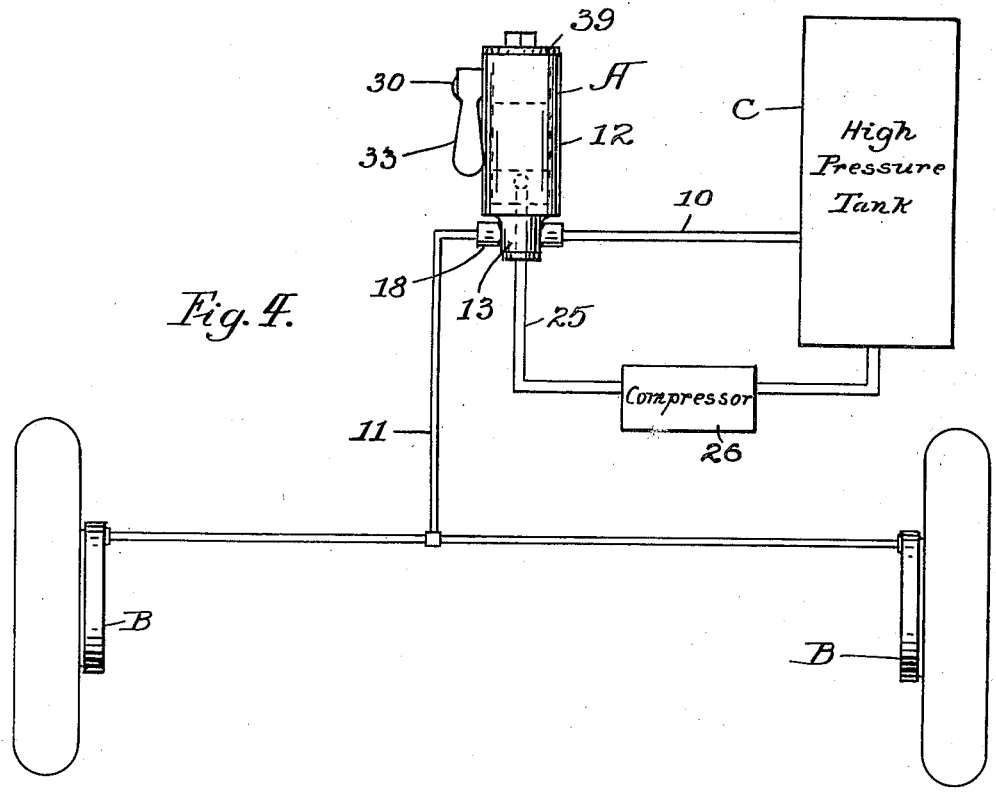
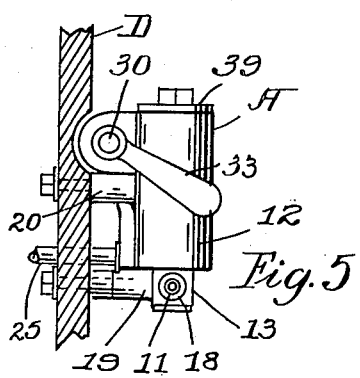
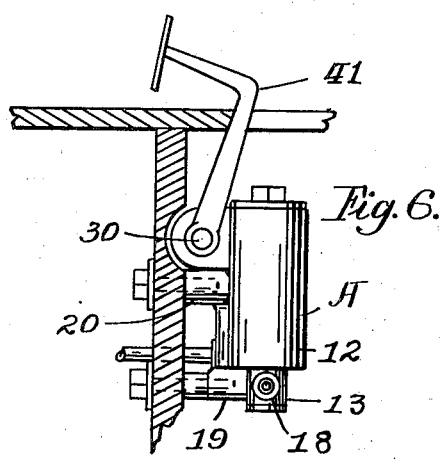
INVENTOR.
James T. Dickson
BY
ATTORNEY.

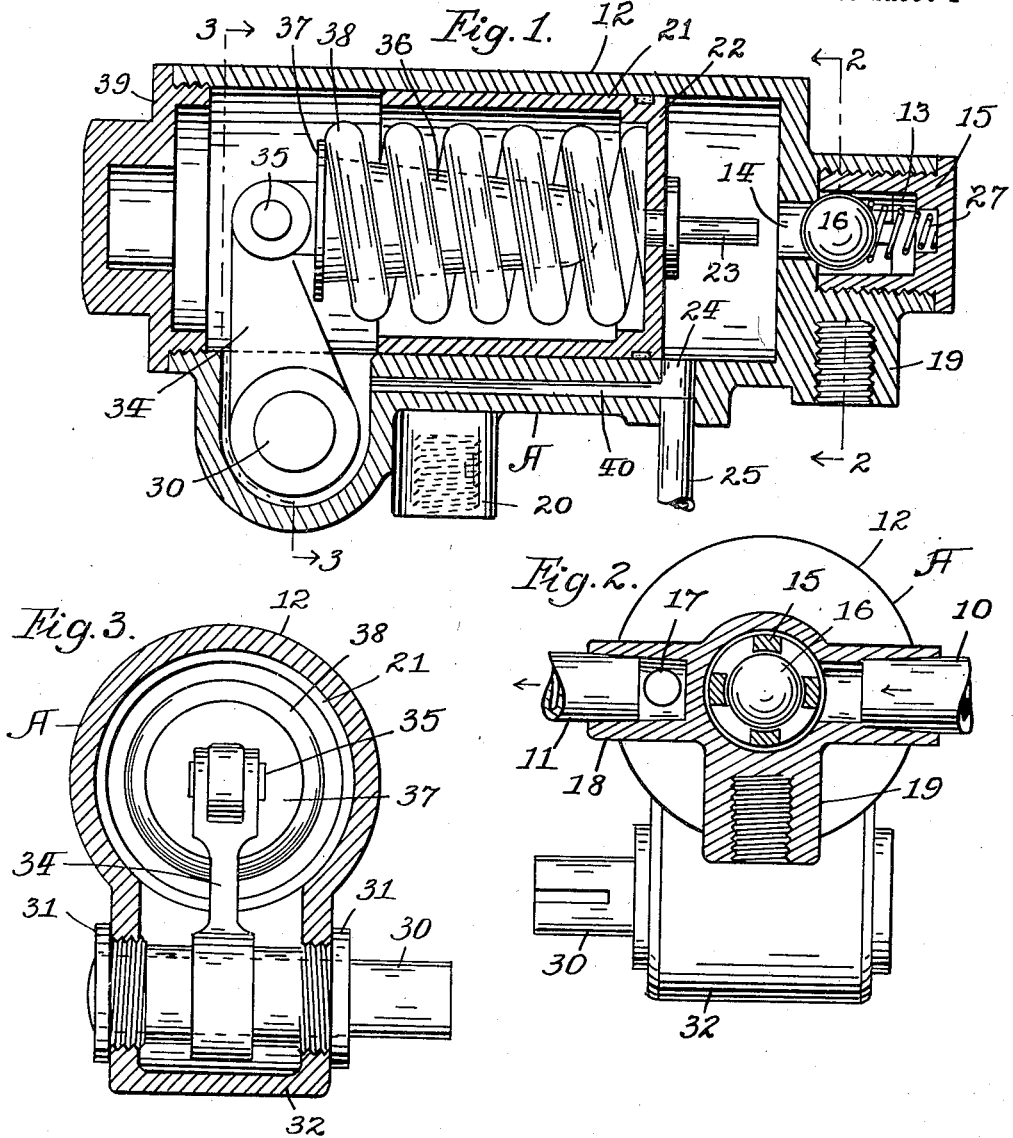

Patented June 10, 1941

2,244,942

UNITED STATES PATENT OFFICE 2,244,942

CONTROL VALVE FOR FLUID BRAKES

James T. Dickson, Los Angeles, Calif.

Application February 26, 1940, Serial No. 320,730

3 Claims. (Cl. 303—54)

My invention relates to improvements in control valves for fluid brakes, and to that type which is more particularly although not exclusively adapted for use for applying braking action to the landing wheels of air planes. A service supply of oil is usually provided on air planes for lubricating and other purposes and it has been common practice to maintain this liquid under heavy pressure for insuring efficient use, by means of a suitable compressor. With my invention I have found it advantageous to employ this liquid service supply for operating the landing gear brakes to effectively control the landing of heavy loads. Due to the heavy pressure maintained in the oil supply reservoir which is usually about 600 pounds to the square inch, more or less, the application of the motivating liquid to the brakes is liable to be sudden and jerky unless some means is provided to overcome this objection. It is the primary object of my invention to provide efficient and easily controllable means for smoothly and effectively applying the motivating fluid for this purpose and entirely overcome said objection.

In the accompanying drawings forming part of this specification, Fig. 1 is a central vertical longitudinal section of my improved control valve for use in controlling the operation of landing gear and other types of vehicle brakes; Fig. 2 is a section taken on the line 2—2 of Fig. 1; Fig. 3 is a section taken on line 3—3 of Fig. 1; Fig. 4 is a schematic plan showing the application of the control valve to the landing gear brakes of an air plane; Fig. 5 is a side elevation of the control valve shown mounted upon a portion of an instrument panel or other support, and Fig. 6 is a detail showing a foot pedal attachment for operating the control valve in place of the handle shown in Fig. 5.

In the drawings, A indicates my improved control valve, B—B a pair of landing gear hydraulic brakes to which, for illustration, my improved control valve is shown applied for use, and C the oil or other fluid supply reservoir from which the actuating medium under suitable pressure is supplied for operating the brakes. Primarily the control valve A allows liquid under comparatively high compression, such as oil, to flow from the compressed oil reservoir chamber C through the brake line ducts 10 and 11 which connect with the brakes. The control valve has a cylinder 12 at one end of which is a valve chamber 13 having an egress port passage 14 coaxial with and leading into the cylinder. Threaded into said valve chamber is a valve cage 15 containing the freely movable ball check valve 16 which seats automatically by the flow of oil through port passage 14 into the cylinder. Liquid under pressure from the reservoir C enters the valve chamber through the high compression brake line duct 10 and when the check valve is forced open as will be hereinafter described, enters the chamber within the cylinder. From the cylinder the brake actuating liquid flows through an egress port passage 17 (see Fig. 2) into a coupling 18 and by the brake line duct 11 is conducted to the brakes B—B. The threaded bosses 19 and 20 on the valve housing and cylinder are provided for mounting the control valve preferably in upright position on the instrument panel D or any other suitable support desired. A helical expansion spring 27 seated in the valve chamber 13 assists in closing the check valve 16 when the latter is released.

Arranged in the cylinder 12 is a hollow piston 21, the head end 22 of which faces the check valve port 14 and mounted upon and coaxial with the head end of this piston is the check valve release pin 23 which is directed towards and is adapted to enter port 14 and open valve 16 when the piston is depressed. At any time that the piston 21 is released, valve 16 closes automatically by the urge of spring 27 and the pressure of liquid from the flow line 10. Any liquid under pressure contained in the chamber between the piston and the lower end of the cylinder will force the piston backwardly into normal position as shown in Fig. 1, in which position an exhaust or vent port 24 in the side of the cylinder is opened and releases spent liquid from the brakes, allowing same to pass via exhaust line 25 back to the compressor 26, either to be recompressed and admitted to the supply reservoir C or conducted to any other suitable receiver. The check valve can be unseated only by the piston and when so unseated the exhaust port 24 is closed by the piston thus causing the motivating liquid under pressure to flow to the brakes through the high compression brake line duct. Under this condition the piston is subject to the full pressure which is acting upon the brakes.

To drive the piston, I provide a transverse operating shaft 30 which is journaled in a pair of bearings 31, which in turn are threaded in the opposite sides of a suitable housing 32. This housing is formed integral with the cylinder 12 and projects from its side. One end of said shaft projects outwardly from the housing 32 and has attached thereto an operating handle 33 (see Fig. 5). Secured to the inner portion of this shaft is a crank arm 34 to the free end of which is freely pivoted by the pin 35 a spring supporting plug 36 which has an annular shoulder 37 near its pivoted end. A coil expansion spring 38 is freely threaded over said plug with one end bearing against said shoulder and its opposite end bearing against the inner closed end 22 of the hollow piston 21. Thus when the crank arm is swung down the piston is urged under spring tension with its pin 23 pressing against, and when sufficient force is exerted, forcing the check valve open. This resilient action enables the operator to more efficiently control the check valve and subsequent operation of the brakes. Such control under resilient application of the valve opening means is particularly effective while the brake motivating liquid acts under relatively high pressure. The braking action is within the operator's control and may be predetermined by him and any desired amount of pressure up to a maximum may be released to the brakes are desired. Should there be an appreciable leak in the brakes, the pressure which is exerted by the operator through the handle 33 will continue to act automatically through the force exerted by the spring to adjust the unseating of the check valve in the brake line. This resilient means for unseating the check valve enables the driver to "feel" the brakes or in other words, to predetermine, without thought or effort other than that ordinarily required, the pressure that will be released to the brakes. The outer end of the cylinder is closed by a threaded cap 39 which provides ready access into the cylinder and a drain duct 40 leading from the cylindrical chamber behind the piston to the exhaust port 24 or exhaust line 25, allows any liquid leaking past the piston 21 to vent outwardly and prevent the piston from becoming locked.

In use the control valve can be mounted on any suitable support convenient for use by the driver, the threaded bosses 19 and 20 providing means by which suitable fasteners may be applied for that purpose. The use of my improved valve control is not confined to airplane landing gear it being obvious that it can be used on motor driven vehicles of any kind desired. Nor is it confined for use on any particular number of brakes. Also when desired any other means desired may be applied to the shaft 30 for operating the device. One other of such means is shown in Fig. 6 in which a foot pedal 41 is connected to the shaft 30 for revolving the latter by foot instead of hand power.

In accordance with the patent statutes I have described the principles of operation of my invention together with the apparatus which I now consider to represent the best embodiment thereof, but I desire to have it understood that the construction shown is only illustrative and that the invention can be carried out by other means and applied to uses other than those above set forth within the scope of the following claims.

I claim:

1. In a valve controller for a high compression fluid brake line, a check valve interposed in said line to check the flow of fluid therethrough, a cylinder upon which said check valve is mounted having an ingress port passage normally closed by said valve, a piston reciprocable in said cylinder having a valve opening element on its head directed through said port passage and adapted when the piston is depressed to open said valve and allow the fluid to circulate through the brake line and the chamber in the cylinder ahead of the piston, and said cylinder having an exhaust passage closed by the piston when the latter is depressed and opened to exhaust liquid from the chamber ahead of the piston in the cylinder received from the brake line when the piston is returned and said valve is released and closed, a compression spring within said cylinder and impressed against said piston adapted when subjected to the action of compression to urge said piston into a position closing said exhaust port and opening said valve, a crank arm journaled on said cylinder having its free end entering the chamber in the cylinder behind the piston and directed against said spring to compress the latter and regulate the urge of the piston and its valve opening element against said valve, and means for reciprocating said crank arm, said cylinder being provided with a drain passage for fluid from the chamber behind the piston to the exhaust port leading from the chamber in the cylinder ahead of the piston.

2. In a valve controller for a high compression fluid actuating brake line, a check valve interposed in said line to check the flow of fluid therethrough, a cylinder connected with said valve, a reciprocable piston in said cylinder having a valve opening element adapted when the piston is depressed forwardly to open said valve, said piston being urged in the opposite direction by the pressure of fluid moving through the valve when the latter is open, and means impressed against said piston for urging the latter forwardly to adjust the opening of said valve by said valve opening element, said cylinder having an exhaust outlet from the chamber ahead of said piston and a drain passage from the cylinder for fluid from the chamber below said piston to said exhaust outlet.

3. In a valve controller for a high compression fluid actuating brake line, a check valve interposed in said line to check the flow of fluid therethrough, a cylinder having an ingress passage normally closed by said valve, a piston reciprocable in said cylinder having a projecting element adapted when the piston is depressed to enter said ingress passage and open said valve, said cylinder having an exhaust passage closed by the piston when the latter is depressed and opened to exhaust fluid received from the brake line into the cylinder when the piston is returned and said valve is released into closed position, a compression spring within said cylinder adapted to resiliently urge said piston into a position closing said exhaust passage and opening said valve, and means tending to compress said spring for urging the piston forward and applying said projecting element under spring pressure against said valve to resiliently adjust the latter and avoid sudden shock and jar from the flow of fluid delivered through the brake line, said cylinder having a drain passage for fluid from the chamber behind the piston to the exhaust passage leading from the chamber in the cylinder ahead of the piston.

JAMES T. DICKSON.